US007827163B2

(12) United States Patent
Masuda et al.

(10) Patent No.: US 7,827,163 B2
(45) Date of Patent: Nov. 2, 2010

(54) APPROXIMATE BLENDING SEARCH SYSTEM

(75) Inventors: Yutaka Masuda, Fujisawa (JP); Tsukasa Fujieda, Yokohama (JP); Toru Iwamoto, Atsugi (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 352 days.

(21) Appl. No.: 10/919,237

(22) Filed: Aug. 17, 2004

(65) Prior Publication Data

US 2005/0044111 A1 Feb. 24, 2005

(30) Foreign Application Priority Data

Aug. 19, 2003 (JP) .............................. 2003-294910

(51) Int. Cl.
*G06F 17/30* (2006.01)
(52) U.S. Cl. ...................... 707/708; 345/603; 345/604; 356/445; 358/523
(58) Field of Classification Search ............. 707/104.1, 707/100, 1–3; 345/593, 603–604; 702/127; 382/156; 705/26; 524/497; 356/445; 358/523
See application file for complete search history.

(56) References Cited

U.S. PATENT DOCUMENTS

| 4,813,000 | A | | 3/1989 | Wyman et al. | |
|---|---|---|---|---|---|
| 5,375,193 | A | * | 12/1994 | Adams, Jr. ................. | 345/603 |
| 5,428,720 | A | * | 6/1995 | Adams, Jr. ................. | 345/604 |
| 5,909,291 | A | * | 6/1999 | Myers et al. ................ | 358/523 |
| 6,166,814 | A | * | 12/2000 | Pringle ....................... | 356/445 |
| 6,750,970 | B2 | | 6/2004 | Masuda | |
| 7,250,464 | B2 | * | 7/2007 | Friel et al. .................. | 524/497 |
| 2002/0152049 | A1 | * | 10/2002 | Lewis ........................ | 702/127 |

FOREIGN PATENT DOCUMENTS

| WO | 01/44767 | 6/2001 |
|---|---|---|
| WO | 01/97090 | 12/2001 |

* cited by examiner

*Primary Examiner*—Don Wong
*Assistant Examiner*—Sheree N Brown
(74) *Attorney, Agent, or Firm*—Wenderoth, Lind & Ponack, L.L.P.

(57) ABSTRACT

An approximate blending search system includes a material information database constituted by accumulating names of a plurality of blending materials and property information codes constituted by a plurality of identification codes to which a plurality of pieces of property information on the blending materials are respectively related, a blending composition database constituted by accumulating names of compositions, names, property information codes, and blending quantities of the blending materials constituting the compositions, a prospective composition search unit for approximately searching a corresponding composition from the blending composition data base in accordance with the measurement data input from the input means and/or at least one or more identification codes of the property information codes in an optical blending material, and a display unit for displaying an obtained search result.

2 Claims, 1 Drawing Sheet

APPROXIMATE BLENDING SEARCH SYSTEM

FIELD OF THE INVENTION

The present invention relates to an approximate blending search system capable of quickly selecting an approximate composition blending in accordance with measurement data for a composition constituted by a plurality of blending materials in which physiochemical properties are coded.

BACKGROUND OF THE INVENTION

A technique for searching an approximate blending in accordance with certain measurement data by using a database storing the blending of a plurality of compositions and measurement data for the compositions is used for various purposes.

For example, in the case of compositions such as paint, ink, and coloring agent, an approximate blending search is performed in accordance with a plurality of blending properties and color measurement data for each paint color. Specifically, a method and an apparatus are proposed which color-measure a desired selected color by using a portable chromatometer, store the color data for the selected color (e.g. color value of CIE Lab, Munsell, or HVC), connect the color data in the chromatometer to a computer, store a plurality of usable color material blendings in the computer, store the color data for each paint designated by the stored usable color material blendings in the computer, compare the color data for the selected color received from the chromatometer with the stored color data showing the stored usable color material blendings to find the most approximate matching, select the stored color material blending shown by the color data found as the most approximate matching, and thereby perform color matching for the selected color (for example, refer to U.S. Pat. No. 4,813,000). Moreover, the present applicant also proposes a method for searching an approximate color out of stocked colors by using multiangle color measurement data and thereby calculating a weighted angle average color difference for a metallic paint color including an effective pigment such as aluminum flake or pearl mica (for example, refer to U.S. Pat. No. 6,750,970).

However, the above conventional method can search a blending composition having a desired paint color but it is difficult to estimate performances of a paint having the blending composition (for example, sedimentation characteristic of paint, impact resistance of paint film, weather resistance of paint film, and color fading characteristic of paint color) by the method. This is because a paint or ink is a composition made of a plurality of blending materials including a coloring pigment and an effective pigment for controlling a color and a plurality of combinations of color materials to realize the same color may be present. That is, because blendings of color materials are different for the same paint colors, physiochemical properties (for example, sedimentation characteristic, weather resistance, acid resistance, and finish characteristic) other than color in a paint or paint film are different. Thus, to estimate physiochemical properties other than color, it is necessary to know physiochemical properties and the blending quantity of color materials constituting a color.

In general, however, a color material name is frequently shown by a trade name or prototype name and managed by the trade name or prototype name also in the case of a database. Therefore, it is impossible to consider performances derived from physiochemical properties of blending materials of color materials. Therefore, even if a plurality of prospective blendings are obtained by the search of an approximate paint color using the above color material data, a lot of time is required for study because an engineer who know the trade names of blending materials selects a blending composition having a necessary physiochemical property out of the prospective blendings based on past experiments. Moreover, when it is determined that a once-selected prospective blending is not proper, it is necessary to newly select another blending. In this case, it is requested to quickly select a new blending composition through a simple treatment.

It is an object of the present invention to provide a blending search according to a physiochemical property of a blending material in a composition constituted by a plurality of blending materials such as paint or ink and moreover provide an approximate blending search system capable of quickly selecting an approximate composition blending by properly combining the blending search according to the physiochemical composition with the blending search according to measurement data. Further, it is another object of the present invention to provide an approximate blending search system capable of quickly selecting an approximate composition blending out of colors of paint, ink, and plastic constituted by a plurality of color materials in which physiochemical properties are coded.

SUMMARY OF THE INVENTION

The present invention relates to:

1. an approximate blending search system of a composition using a computer constituted by input means, control means, storage means, and display means, characterized in that the following are included: a material information database obtained by accumulating names of a plurality of blending materials and property information codes constituted by a plurality of identification codes to which a plurality of property information on the blending materials are respectively related, a blending composition database obtained by accumulating names of compositions, the blending material names constituting the compositions and their property information codes, blending quantities, and measurement data according to the compositions every different composition, prospective composition search means for approximately searching a corresponding composition out of the blending composition database in accordance with the measurement data input from the input means and/or at least one or more identification codes of the property information codes in an optional blending material, and means for displaying an obtained search result, 2. the approximate blending search system of the above Item 1, in which prospective composition search means searches a composition in which the difference from purposed measurement data falls under a specific range, 3. the approximate blending search system of the above Item 1, in which prospective composition search means searches a composition including a blending material in which at least one or more identifications of property information codes in an optional blending material coincide with each other, 4. the approximate blending search system of the above Item 1, in which a composition is a color material composition selected from paint, ink, and coloring agent, 5. the approximate blending search system of the above Item 1, in which a blending material is a color material selected from coloring pigment, effective pigment, and dye and measurement data according to compositions using them as components is color measurement data, and 6. the approximate blending search system of the above Item 5, in which property information codes of a blending material and effective pigment are constituted by identification codes to which at least two or more property informations selected from color information, substance name information, size information, and chemical structure information are respectively related.

According to the present invention, by constructing a database obtained by setting a plurality of identification codes to which a plurality of property informations on each of a plurality of blending materials are related and providing property information codes constituted by the identification codes for each of the blending materials, and accumulating the property information codes, it is possible to search the blending composition of paint or ink in accordance with the physiochemical property of a blending material and accurately perform purposed blending search by using a database for storing measurement data derived from a composition for approximate color search together.

DETAILED DESCRIPTION OF THE INVENTION

Figure 1:
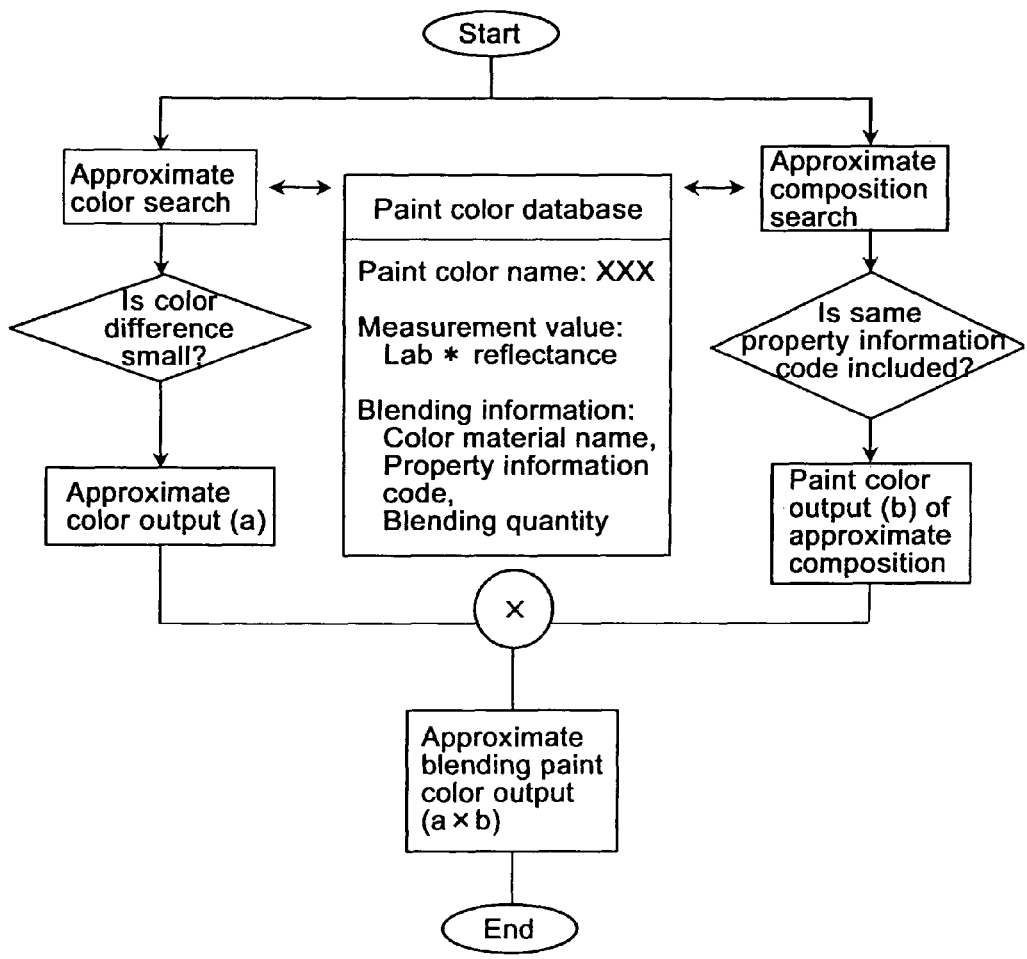
FIG. 1 is a system flow chart for explaining an embodiment of the present invention.

A system of the present invention is constituted by incorporating a prospective blending search program having a material information database and a blending composition database into a personal computer body constituted by a CPU, memory, hard disk, CD-ROM driver, DVD-ROM drive, and floppy disk, and the personal computer body of a general-purpose personal computer system (hereafter referred to as PC) constituted by an input section including a keyboard and mouse, display portion such as a display, and output portion such as a printer.

The material information database accumulates names of a plurality of blending materials and property information codes constituted by a plurality of identification codes to which a plurality of pieces of property information on the blending materials are related respectively.

The name of each blending material may be a trade name having been hitherto provided or a prototype name, wherein a serial number is provided for each of the materials.

It is preferable to prepare an identification code table according to a property name and an identification code showing the property name for each piece of property information on various chemical and physical properties. It is preferable that a numeral or alphabet is mainly provided for an identification code from the viewpoint of ease of search, and it is possible to store the information for adding the property information on each identification code to the identification code table by forming a remarks column.

As described above, a property information code constituted by a plurality of identification codes is provided for each blending material and it is possible to express physiochemical properties specific to each blending material which is unknown by a trade name or prototype name which has been hitherto provided for a blending material from a plurality of viewpoints.

For example, when a composition is a color material composition selected from ink or coloring agent and when noticing color materials such as coloring pigment, effective pigment, and dye as the blending material of the color material composition, it is possible to constitute the property information code by an identification code to which at least two or more pieces of property information selected from color information, substance name information, size information, and chemical structure information are related. It is possible to prepare an identification code table for each piece of property information and provide a specific property information code for each coloring pigment and effective pigment in accordance with the table.

The blending composition database accumulates the name of each composition, the name of each of the blending materials constituting the composition and its property information code, blending quantity, and measurement data according to the composition.

It is possible to use a nature value or performance test value of a formed film and molded product by a composition or the nature value of the composition for the measurement data.

For example, when a composition is a color material composition selected from paint, ink, or coloring agent and when noticing a coloring pigment and effective pigment as the blending material of the color material composition, measurement data for a color according to the color material composition is used as measurement data according to the color material composition including the coloring pigment and effective pigment as components.

The prospective blending search program realizes an approximate search of a corresponding composition out of the blending composition database in accordance with measurement data input from the input means and/or at least one or more identification codes of property information codes in an optional blending material. Specifically, the program is used to input purposed measurement data, search a composition in which a difference from the measurement data corresponds to a specific range, and moreover input at least one or more identification codes of purposed property information codes and search a composition containing a blending material in which at least one or more identification codes of the property information codes coincide with each other.

EXAMPLE 1

An example of the present invention is specifically described below by citing the case of a paint using a color material such as a coloring pigment or effective pigment as a blending material.

(1) Preparation for Identification Code Table

Color information which can be classified in accordance with color development, substance name information which can be classified in accordance with chemical composition, size information which can be classified in accordance with particle diameter, and chemical structure information which can be classified in accordance with CI Name are selected as pieces of property information on color materials and an identification code table of this information is prepared as shown below. It is also possible to increase the number of pieces of property information according to necessity.

First, the color information can use the hue name of Munsell used for color classification or the hue name of the NCS color system as shown in the following Table 1. For the hue, it is preferable to use a color obtained by diluting the paste obtained by dispersing a coloring pigment in a resin with a white pigment such as titanium white, that is, a hue having a highest chroma. Moreover, when using a color including a quality sense having a shading sense, it is possible to use silver for aluminum paste. In the case of an interference color such as pearl, it is easily classified by adding a prefix showing "interference". Identification codes in the color information in Table 1 are only examples. How to add a code name and types of code names are not restricted to those shown in Table 1.

TABLE 1

| Identification code | Color name |
|---|---|
| wh | white |
| gy | gray |
| bk | black |
| re | red |
| or | orange |
| ye | yellow |
| gn | green |
| bg | blue-green |
| bl | blue |
| vl | violet |
| iye | pearl yellow (interference yellow) |
| ibl | pearl blue (interference blue) |
| sl | silver |

Then, the substance name information can use the pigment name in the case of a coloring pigment and the substance name of the base material in the case of an effective pigment as shown in Table 2. Identification codes in the substance name information in Table 2 are only examples, and how to add a code name and types of code names are not restricted to those shown in Table 2.

TABLE 2

| Identification code | Substance name |
|---|---|
| alox | almina |
| almm | aluminum |
| biv | bismuth vanadate |
| cb | carbon |
| cf | chroma flari |
| dio | dioxazine |
| dpp | diketopyrrolopyrrole |
| ith | indanthrone |
| bio cl | oxi bithmus chloride |
| pc | phthalo cyanine blue |
| pc | phthalo cyanine green |
| pe | perylene |
| pio | plate iron oxide |
| mio | micasuis iron oxide |
| mica | natural pearl |
| qa | quinacridone |
| qd | quinoxalinedione azo |
| qph | quino phthalone |
| siox | silica flake |
| tai | thiaindigo |
| tan | zinc ferrite |
| tiox | titanium dioxide |
| rmica | reduction mica |

Then, size information can be classified as shown in Table 3. In the case of coloring pigments, a large pigment having a particle diameter of 0.1 pm or more is an opaque type having a covering power and a small pigment having a particle diameter of 0.1 pm or less is a transparent type which shows designability by mixing with an effective pigment. Because smaller particle diameter further affects weather resistance, it is possible to show a particle diameter by forming a remarks column in an identification code table according to necessity.

A large particle diameter of an effective pigment provides a micro-quality sense such as a dazzling sense for a paint color and a small particle diameter provides a micro-quality sense such as precise sense or silky sense for the paint color. Therefore, when minutely classifying average particle diameter ranges, it is easy to estimate the finished state of a paint color.

Identification codes in the size information in Table 3 are only examples and how to add a code name and types of code names are not restricted to those shown in Table 3.

TABLE 3

| Identification code | Size | Particle diameter |
|---|---|---|
| trp | transparent | Average particle diameter of 0.1 μm or less |
| opq | opaque | Average particle diameter of 0.1 μm or more |
| vcoa | vary coase | Average particle diameter of 25 μm or more |
| coa | coase | Average particle diameter of 20-25 μm |
| med | medium | Average particle diameter of 15-20 μm |
| fine | fine | Average particle diameter of 10-15 μm |
| vfine | very fine | Average particle diameter of 10 μm or less |

Chemical structure information can be classified in accordance with CI Name, that is, internationally-recognized Color Index Name. For example, there may be some of phthalocyanine blue in the above substance name information, in which pigment stability and hue are different in accordance with a different crystal structure and halogenation degree. Identification codes in the chemical structure information in Table 4 are only examples, and how to add a code name and types of code names are not restricted to those shown in Table 4.

TABLE 4

| Identification code | C.I. Name | Common name |
|---|---|---|
| pw6 | PW6 | titanium white |
| pbk7 | PBk7 | carbon black |
| py42 | PY42 | iron oxide (yellow) |
| pr101 | PR101 | iron oxide (red) |
| pv23 | PV23 | dioxazine |
| pr254 | PR254 | diketopyrrolopyrrole |
| pb15:1 | PB15:1 | phthalocyanine blue α type |
| pb15:3 | PB15:3 | phthalocyanine blue β type |
| pb64 | PB64 | indanthrone |

(2) Material Information Data Table

By properly connecting identification codes according to the above color information, substance name information, size information, and chemical structure information according to necessity, it is possible to construct a material information data table to which a property information code specific to a coloring pigment or effective pigment is 10 provided as shown in Table 5. In the data table, the same property information code is provided for the same materials even if trade names are different.

It is possible to properly show the covering power, micro-quality sense, and influence of a composition on performance of the material in the material information data table by forming a remarks column in the table according to necessity.

TABLE 5

| Material name | Property information code |
|---|---|
| Coloring pigment based | |
| Trade name A (Titanium white) | wh-tiox-opq-pw6 |
| Trade name B (Micro-titanium) | wh-tiox-trp-pw6 |

TABLE 5-continued

| Material name | Property information code |
|---|---|
| Trade name C (Carbon black) | bk-cb-opq-pbk7 |
| Trade name D (Red pigment 1) | re-qa-opq-pv19 |
| Trade name E (Red pigment 2) | re-dpp-opq-pr254 |
| Trade name F (Red pigment 3) | re-qa-trp-pr202 |
| Trade name G (Red pigment 4) | re-qa-trp-pr202 |
| Trade name H (Red pigment 5) | re-pe-trp-pr179 |
| Trade name I (Blue pigment 1) | bl-pc-trp-pb15:1 |
| Trade name J (Blue pigment 2) | bl-pc-trp-pb15:1 |
| Trade name K (Blue pigment 3) | bl-pc-trp-pb15:3 |
| Trade name L (Blue pigment 4) | bl-pc-trp-pb75 |
| Trade name M (Blue pigment 5) | bl-ith-trp-pb60 |
| Trade name N (Blue-green pigment) | bg-pc-trp-pg37 |
| Trade name O (Green pigment) | gn-pc-trp-pg7 |
| Trade name P (Violet pigment) | vi-dio-trp-pv23 |
| Effective pigment based | |
| Trade name Q (Aluminum paste 1) | sl-almm-vcoa |
| Trade name R (Aluminum paste 2) | sl-almm-coa |
| Trade name S (Aluminum paste 3) | sl-almm-med |
| Trade name T (Aluminum paste 4) | sl-almm-fine |
| Trade name U (Colored aluminum) | ye-almm-vcoa |
| Trade name V (Colored aluminum) | or-almm-coa |
| Trade name W (Interference white mica) | iwh-mica |
| Trade name X (Interference gold mica) | iye-mica |
| Trade name Y (Interference blue mica) | ibl-mica |
| Trade name Z (Multicolor chromaflare) | iml-cf |

(3) Construction of Paint Color Database

Spectral reflectances of finish-coating paint colors of approximately 3,000 colors (including 2,900 metallic paint colors) for vehicle outer plate which are stock colors prepared in the past are measured by the portable variable-angle spectrophotometer MA68 (incident at 45° and light receiving at 15°, 25°, 45°, 75°, and 110°) made by US X-Rite Inc. and paint colors and 5°-angle Lab* values of the color measurement values of the finish-coating paint colors are stored in the memory of a computer. Moreover, each color material name in the blending composition of each stock color and its property information code and blending quantity are also stored in the computer.

It is allowed that a database is present in the memory of a local personal computer or in a server on Internet connected through LAN.

(4) Prospective Blending Search

The approximate blending search according to the above paint color database is described below by referring to FIG. 1. FIG. 1 is a system flow chart for explaining an example.

An optional metallic paint color (including aluminum pastes 2 and 3, blue pigments 1 and 5, and carbon black as color materials) is selected out of the paint color database to perform approximate search on whether an approximate color is present in the database on the basis of the selected metallic paint color. The approximate search conforms to approximate color calculation for calculating the color difference dE* specified in JIS Z8730 from the Lab* value of five angles. In the case of the approximate color calculation, a "weighted angle average color difference" is calculated which is obtained by multiplying each angle and L* value by a weighted coefficient so as to relate to visual observation of a person as disclosed in U.S. Pat. No. 6,750,970. The "weighted angle average color difference" is hereafter merely referred to as "color difference".

As the color difference decreases, a paint color approximate to a reference color is obtained and 25 paint colors having color differences of 7 or less are output starting with a paint color having the smallest color difference (approximate output a).

Then, a paint color including a color material having a property information code the same as that of a color material included in the reference color is searched. In this case, it is also possible to search a paint color including property information codes of all five color materials included in the reference color. It is possible to search a paint color including property information codes of the aluminum paste 2 and blue pigment 4 among the five color materials. Actually, it is proper to search a paint color including color materials in which only identification codes having a purposed property coincide with each other among property information codes as an approximate composition.

Specifically, as a result of inputting (s1-almm)×(b1-ith-trp)×(b1-pc-trp) as a search character string, 43 paint colors coincide with each other (approximate output b).

The number of paint colors which are logical products of the above approximate search results a and b is five. Moreover, as a result of inputting (s1-almm-coa)×(s1-almm-med)×(b1-ith-trp)×(b1-pc-trp) by adding an identification code which is the size information in order to approximate the quality sense of aluminum, the number of paint colors which are logical products between a and b is two.

By outputting search results which are logical products between a and b starting with a result having the smallest color difference, it is possible to perform a search of not only color matching but also approximation of color material composition and display approximate blending which is a search result on the screen of a personal computer.

A system of the present invention can perform the blending composition search considering a performance derived from the physiochemical property of a blending material included in a composition. Particularly, in the field of color material composition, by combining the conventional approximate color search with the search according to a property information code, it is possible to use the combination for estimation of the performance of paint or ink including a color material having the blending composition. Moreover, by storing not only the color measurement value at the beginning of painting but also a color measurement value after exposure of the painted plate to the outdoors or an accelerated weather resistance test in a database, it is possible to apply the database as means for confirming the discoloration of a paint color in approximate blending.

The invention claimed is:

1. A computer system comprising:
    a computer processor; and
    an approximate blending search system for compositions, said approximate blending search system comprising:
        a material information database for storing names of a plurality of blending materials and a property information code for each of the plurality of blending materials, wherein each of the property information codes is composed of a plurality of identification codes;
        a blending composition database for storing names of the compositions, names of the blending materials constituting each of the compositions, property information codes for the blending materials constituting each of the compositions, and blending quantities of the blending materials constituting each of the compositions; and
        a prospective composition search unit for searching for a composition stored in said blending composition database in accordance with measurement data input from an input unit and at least one or more of the identification codes of the property information codes;

wherein each of the blending materials is a color material selected from a coloring pigment, an effective pigment, and a dye, wherein, for each of the property information codes, the plurality of identification codes include at least a first identification code and a second identification code, wherein the first identification code is different than the second identification code, wherein, from among a plurality of pieces of property information of the respective blending material, the first identification code represents a first piece of property information of the respective blending material, and the second identification code represents a second piece of property information of the respective blending material, wherein the first piece of property information is different than the second piece of property information, wherein the plurality of pieces of property information include at least two of color information of the respective blending material, substance name information of the respective blending material, size information of the respective blending material, and chemical structure information of the respective blending material, and wherein said prospective composition search unit searches for a composition stored in said blending composition database in which a difference from the measurement data is within a specific range.

2. The computer system according to claim 1, wherein each of the compositions is a color material composition selected from paint, ink, and a coloring agent.

* * * * *